Feb. 27, 1968 P. J. JESSEN ETAL 3,370,357
GAGE FOR CHECKING THE PARALLELISM OF ELEMENT IN
A DISC BRAKE ASSEMBLY
Filed March 23, 1966 2 Sheets-Sheet 2
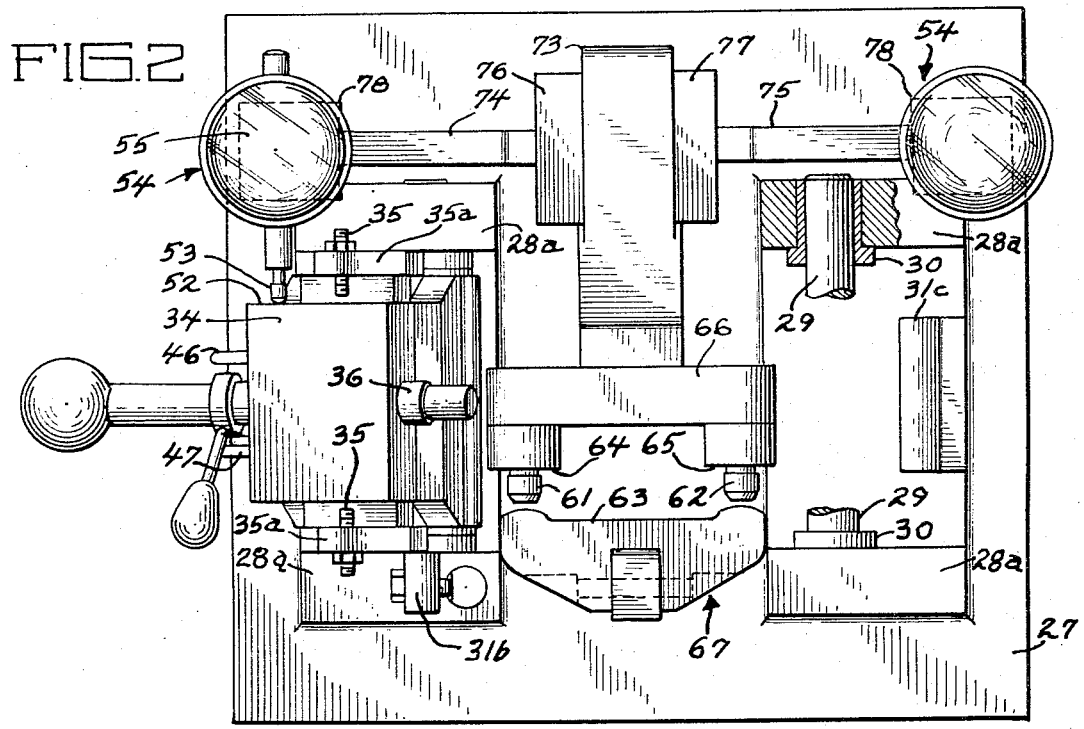
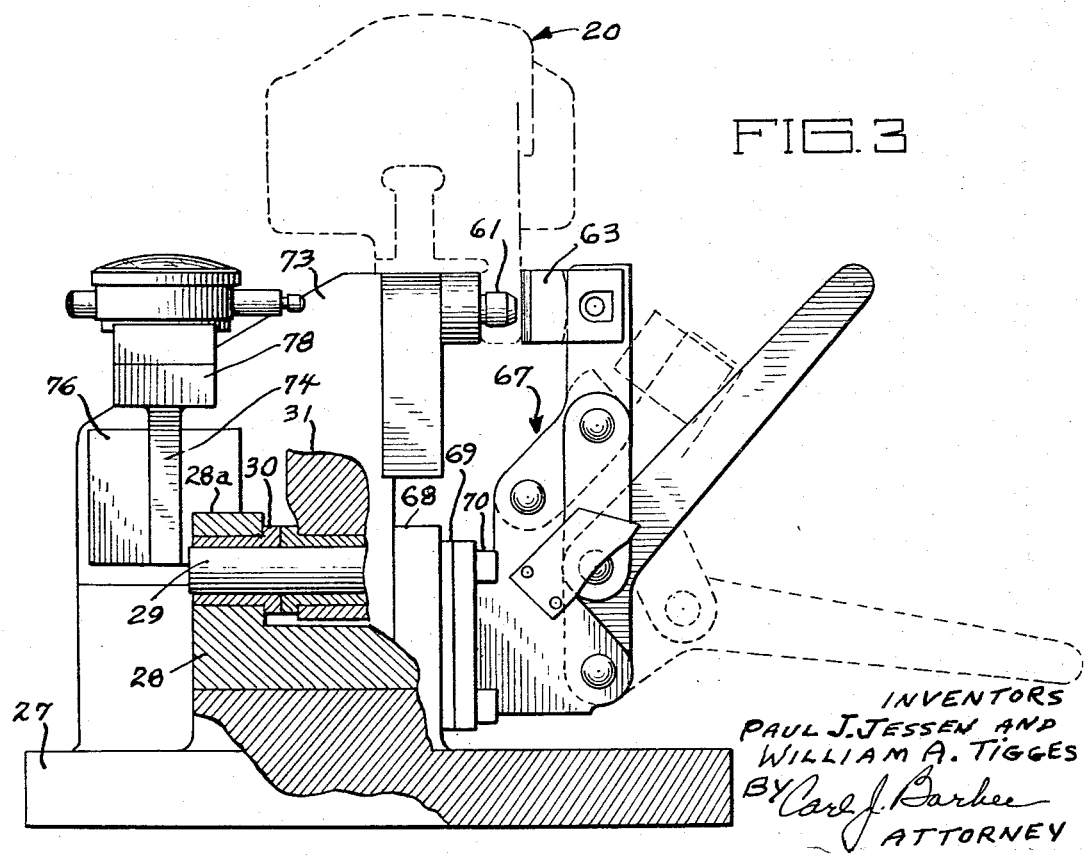
INVENTORS
PAUL J. JESSEN AND
WILLIAM A. TIGGES
BY Carl J. Barbee
ATTORNEY

United States Patent Office 3,370,357
Patented Feb. 27, 1968

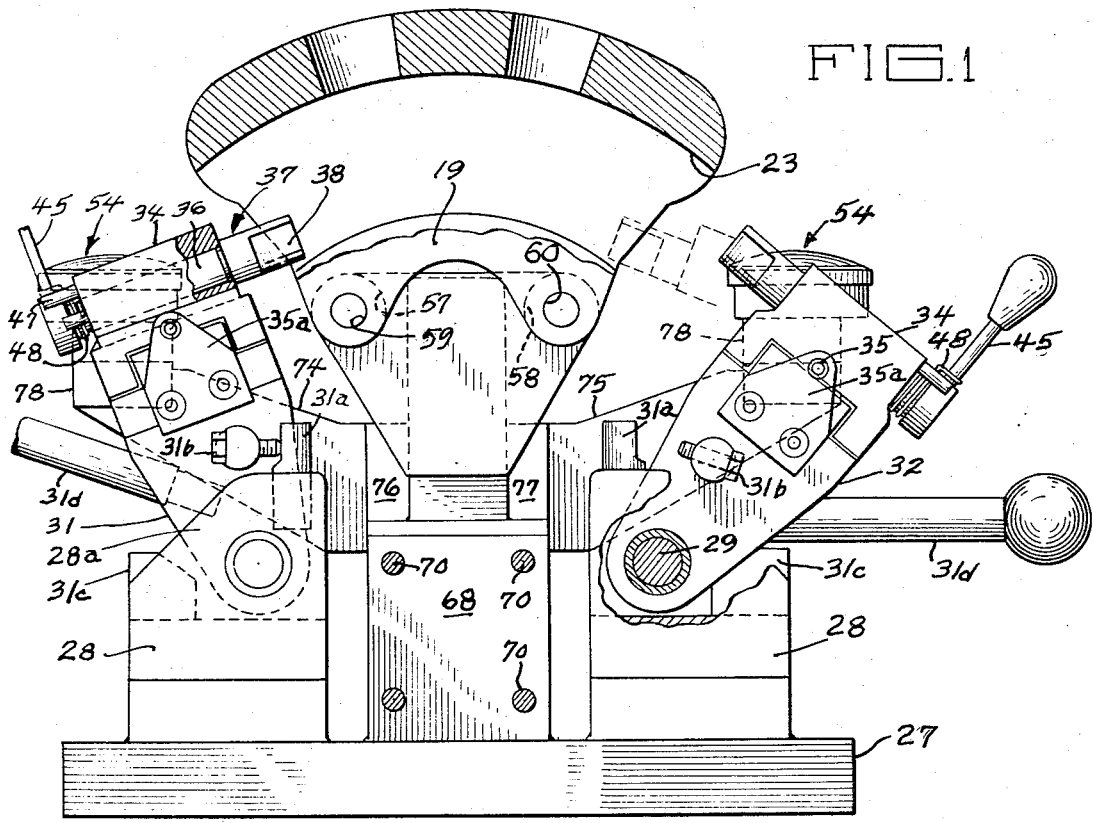
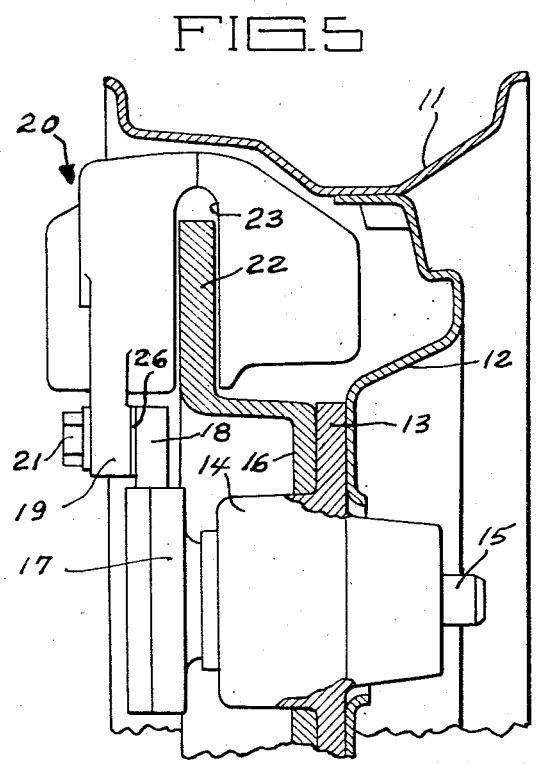
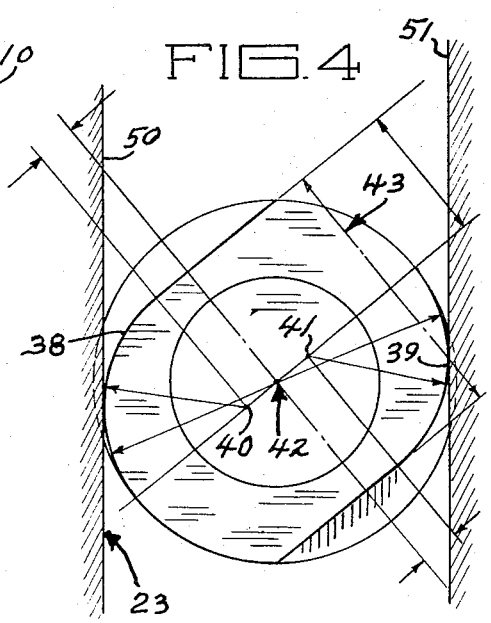

3,370,357
GAGE FOR CHECKING THE PARALLELISM OF ELEMENT IN A DISC BRAKE ASSEMBLY
Paul J. Jessen, 313 Sheridan Road, Kenosha, Wis. 53140, and William A. Tigges, 415 11th St., Racine, Wis. 53403
Filed Mar. 23, 1966, Ser. No. 536,804
5 Claims. (Cl. 33—181)

ABSTRACT OF THE DISCLOSURE

The invention has reference to a gage for use while assembling the elements of a disc brake assembly. In a disc brake assembly, the housing of the caliper assembly is provided with an elongated slot into which the disc, which is fastened to and rotates with the wheel hub, projects. The caliper housing also has a mounting pad formed thereon. The gage has two centering means for insertion into the caliper housing slot at either end thereof and two indicating means individually reflecting the condition of one of the centering means. The gage thus reflects the condition of parallelism or non-parallelism of the slot with reference to the mounting pad.

---

The invention relates to a gage for checking the condition of parallelism or non-parallelism of a caliper assembly slot with reference to the mounting pad thereof.

In the disc brake art the housing of the caliper assembly is provided with an elongated slot into which the disc, which is fastened to and rotates with the wheel hub, projects. It is desirable to have the disc centered quite accurately with reference to the side walls of the caliper housing slot and the gage will indicate whatever shimming is necessary to attain appropriate parallelism and centering.

The principal object of the invention is to provide a gage to measure the distance from the central plane of the caliper housing slot to the spaced mounting surfaces of such housing. Any non-parallel condition can then be rectified with appropriate shimming.

Other objects and advantages of the invention will be apparent from the ensuing specification and appended drawings in which:

FIGURE 1 is a front view of the gage with the housing of the caliper assembly broken in section to reveal the elongated slot thereof. The clamping mechanism is shown removed and a portion of the frame is also shown in section.

FIGURE 2 is a plan view of the gage with one of the carrier assemblies removed.

FIGURE 3 is an end view of the gage with one of the carrier assemblies broken in section to provide an appropriate showing of the clamping mechanism, the caliper housing being shown in dotted lines.

FIGURE 4 is an enlarged detail view of one of the centralizing cams shown with the slot in the caliper housing.

FIGURE 5 is a side view, partially in section, of a typical disc type brake installation relative to a vehicle wheel.

Referring briefly to FIGURE 5, there is shown a vehicle wheel 10 including rim portion 11 anchored to the central portion 12 which in turn is anchored to the hub flange 13. The hub 14 is rotatably carried on the stationary wheel spindle 15 and the brake disc 16 is also anchored to the hub flange 13 so as to be rotatable along with the wheel and hub. The wheel supporting spindle includes an enlarged bracket portion 17 which includes at its upper end a mounting pad 18 to which the downwardly depending mounting pad 19 of the brake caliper 20 is anchored by means of bolts 21. Suitable braking pads or shoes (not shown) are mounted within the brake caliper housing on either side of the circular disc 22 for engaging the opposite side faces of said disc during the braking operation.

It is important that the spaced mounting surfaces of the mounting pad 18 be checked for parallelism with reference to a central plane drawn through the brake disc 22 in order that appropriate shims 26 may be provided to correct any non-parallelism. The gage for accomplishing these functions forms the subject matter of a separate application Ser. No. 533,916, filed Mar. 14, 1966.

It is also important that the disc 22 be positioned within caliper slot 23 so that its side faces are in parallelism with the side faces of the slot and so that the disc is properly centered within the slot.

Referring to FIGURES 1 to 3, the gage includes a base 27 to which frames 28 are secured. Each frame 28 has upwardly projecting walls 28a at each end thereof for carrying the pivot pin 29.

The pivot pins 29 are mounted in bushings 30 so that the carriers 31 and 32 are mounted for swinging movement about the axis of such pins. Each carrier has a handle 31d secured thereto for manual grasping to move the carrier upwardly to the position shown on the left hand side of FIGURE 1. It will be noted that the carriers at each end of the base and all of the components associated therewith are of similar construction and hence only one will be described. Each carrier has a carriage or slide 34 of conventional construction and preferably of the ball mounted type to permit transverse movement between the two stop pins 35. The stop pins are adjustably secured to the stop plates 35a which are secured at the opposite ends of the carriers 31. The swinging movement of each carrier is limited in one direction by the stop pins 31a being engaged by the adjustable stop members 31b. Movement of the carriers in the reverse or retracting direction is limited by the bumpers 31c. Each carriage is provided with a central bore therethrough to receive the shank portion 36 of the centering means or centralizing cam assembly, identified generally by the numeral 37. Such assembly includes a head portion which has the centralizing cam surfaces 38 and 39 thereon.

Referring to FIGURE 4, there is an enlarged showing of the head portion which has the cam surfaces thereon. Each of the cam surfaces are generated from axes 40 and 41 which are of equal distance from the axis 42 of the shank. The dimension 43 is the smallest diametric dimension of the head portion and permits entry of the head portion into the caliper housing slot by manual manipulation of the handles 45. The handles are capable of movement within the limits provided by the stop pins 46 and 47 (as best shown in FIGURE 2). A torsion spring 48 continuously urges the handle 45 in one direction so that when the head portion is inserted within the caliper housing slot 23, the manual release of the handle will cause automatic rotation of the cam assembly 37 until the cam surfaces on either side of the axis 42 are in engagement with the opposite side walls 50 and 51 of the caliper housing slot. In this position of the cam surfaces the carriage 34 will have shifted transversely automatically. The end wall 52 thereof is continuously engaged by the head 53 (which is part of the indicator assembly 54). The indicator assembly will provide a reading on the dial 55 which reflects the position that the carriage has assumed with reference to the caliper slot. The indicator assembly at the opposite end of the base will reflect similar information and a check of the reading of both indicators will reflect the condition of parallelism or non-parallelism of the center plane of the slot relative to the spaced mounting surfaces 57 and 58 of the mounting pad 19. Likewise the distance from the center plane of the housing slot to the mounting surfaces 57 and 58 is provided by the indicating means.

The mounting pad 19 of the caliper housing is held in place during the gaging procedure by having the openings 59 and 60 mounted on the locating pins 61 and 62 and the clamp shoe 63 bears against the mounting pad to urge same tightly against the mounting surfaces 64 and 65 of the mounting member 66. The clamp shoe 63 is carried at the upper end of the toggle type clamping mechanism identified generally by the numeral 67. The clamping mechanism is mounted on the mounting portion 68 with a fitting spacer 69 associated therewith. Bolts 70 hold the foot portion 71 of the clamping mechanism relative to member 68.

Secured to the base 27 centrally thereof is an upright 73. On either side thereof are support wings 74 and 75 secured to the pads 76 and 77 which are secured on either side of the upright. At the outer ends of each wing a block 78 is anchored and they serve as supports for the indicator assemblies 54. In FIGURE 2 the indicating means on the right hand side of the upright is not complete and reference should be made to the indicating means on the left hand side of the upright for completeness—the assembly being of conventional construction. The mounting member 66 is carried on the forward portion of the upright and the clamping mechanism mount 68 is secured at the forward and lower end of the upright.

We claim:

1. A gage for indicating the condition of parallelism or non-parallelism of the opposite side walls of an elongated slot in a device with reference to spaced locations on a mounting pad of the device, comprising:
    (a) a base;
    (b) a mounting member projecting from the base and having spaced mounting surfaces thereon;
    (c) carriers pivotally mounted on the base on either side of the mounting member so as to swing toward and away from the mounting member;
    (d) a carriage slidably mounted on each carrier in the direction of the axis of the pivotal mounting of such carrier;
    (e) centering means rotatively mounted on each carriage about an axis which is transverse to the axis of the pivotal mounting of the carrier of such carriage;
    (f) each centering means being movable toward and away from the mounting member;
    (g) indicating means carried on the base and coacting with the sliding carriages for reflecting carriage movement.

2. A gage as set forth in claim 1 wherein each centering means has diametrically opposed cam surfaces thereon and resilient means are carried on each carriage for automatically rotating the centering means to effect relative movement of the carriages.

3. A gage as set forth in claim 1 wherein clamping means are carried on the base for movement toward the spaced mounting surfaces on the mounting member.

4. A gage as set forth in claim 3 wherein the centering means includes a shaft portion rotatively mounted on each carriage and each centering means includes a head portion at the end of the shaft portion and diametrically opposed substantially symmetric cam surfaces on each head portion.

5. A gage as set forth in claim 4 wherein resilient means are mounted on each carriage engaging the centering means on such carriage to normally rotate same to effect relative movement of the carriage.

References Cited

UNITED STATES PATENTS

| 2,543,492 | 2/1951 | Garay | 33—201 |
| 2,637,116 | 5/1953 | Wiebe | 33—147 |
| 2,717,452 | 9/1955 | Richardson et al. | 33—174 |

WILLIAM D. MARTIN, JR., *Primary Examiner.*

UNITED STATES PATENT OFFICE
CERTIFICATE OF CORRECTION

Patent No. 3,370,357  February 27, 1968

Paul J. Jessen et al.

It is hereby certified that error appears in the above numbered patent requiring correction and that the said Letters Patent should read as corrected below.

In the heading to the printed specification, lines 4 to 6, for "Paul J. Jessen, 313 Sheridan Road, Kenosha, Wis. 53140, and William A. Tigges, 415 11th St., Racine, Wis. 53403" read -- Paul J. Jessen, Kenosha, Wis. and William A. Tigges, Racine, Wis., assignors to American Motors Corporation, Kenosha, Wis., a corporation of Maryland --.

Signed and sealed this 6th day of May 1969.

(SEAL)
Attest:

EDWARD M. FLETCHER, JR.
Attesting Officer

Commissioner of Patents